United States Patent Office 2,712,025
Patented June 28, 1955

2,712,025

PRODUCTION OF DICARBOXYLIC ACID ESTERS OF ALPHA-HYDROXYCARBOXYLIC ACID ESTERS

Chessie E. Rehberg, Glenside, Pa., and Charles H. Fisher, New Orleans, La., assignors to the United States of America as represented by the Secretary of Agriculture No Drawing. Application September 26, 1951, Serial No. 248,440

1 Claim. (Cl. 260—347.4)

(Granted under Title 35, U. S. Code (1952), sec. 266)

The invention herein described may be manufactured and used by or for the Government of the United States of America for governmental purposes throughout the world, without the payment to us of any royalty thereon.

This invention relates to plasticizers and especially those produced by esterifications in which a diester is formed by reacting a dicarboxylic acid with a monohydric alcohol ester of an alpha-hydroxycarboxylic acid to esterify both carboxyl groups of the dicarboxylic acid. These esterifications are conventionally carried out by heating a mixture of the dicarboxylic acid and the alpha-hydroxycarboxylic acid ester in the presence of an acid catalyst.

The reaction is illustrated by the following reaction equation:

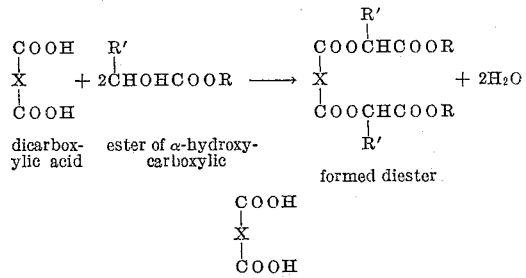

being an aliphatic dicarboxylic acid having not more than 10 carbon atoms or phthalic acid, R a monovalent group, preferably alkyl but including other hydrocarbons and alkoxy- and halo-substituted hydrocarbons, and R' being H or alkyl, preferably methyl.

Such esterification processes are complicated by formation of byproducts. The alpha-hydroxycarboxylic acid ester, being also an alcohol, is capable of undergoing intermolecular self-alcoholysis, or self-esterification, producing the monohydric alcohol ROH corresponding to the ester of alpha-hydroxycarboxylic acid and polyester of alpha-hydroxycarboxylic acid, as illustrated by the following equation:

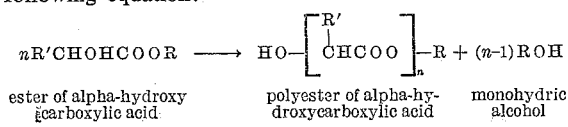

$n$ being an integer of at least 2.

The formed monohydric alcohol ROH and formed polyester are thus also available for reaction with the dicarboxylic acid so that in addition to the desired diester, significant amounts of esters corresponding to the following formulas are produced as byproducts:

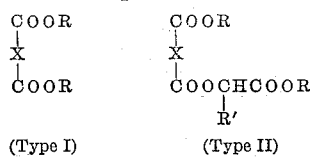

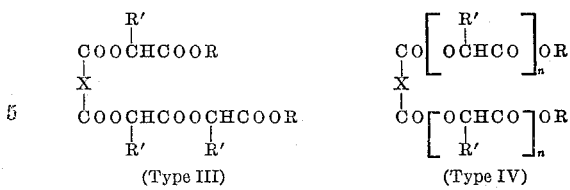

The formation of these several byproduct esters results in lowering the yield of the desired diester and renders purification of the reaction products to obtain a composition of high percentage in the desired diester more difficult, so that it is desirable for economic reasons to limit formation of undesirable byproduct esters and to limit purification as much as feasible without rendering the final composition unsatisfactory for an intended purpose.

Where the final composition is used as a plasticizer, the presence of the Type I byproduct ester is objectionable because of the relatively high volatility of such ester, and if X or R are long hydrocarbon chains, its poor compatibility with synthetic plastics. Byproduct esters of Types II and III are usually efficient plasticizers, and their presence is not objectionable. The presence of the Type IV byproduct ester is sometimes undesirable because of the relatively low plasticizing efficiency of such ester, though this is in some instances offset by its high compatibility and low volatility.

In general, according to the present invention, formation of the Type I and Type IV esters is suppressed thus to obtain a higher yield of the desired diester. Suppression of Type I ester formation is accomplished by addition of the Type I ester to the reaction mixture and of the IV ester by addition of the ROH alcohol. If it is desired to suppress formation of both Type I and Type IV esters, the esterification can be conducted in presence of both the added Type I ester and the ROH alcohol.

The invention is exhibited in specific detail by the following examples:

*Example I*

A control was first run according to the following procedure:

Two moles of butyl lactate (R=butyl), one mole of adipic acid (X=(CH$_2$)$_4$), and 1.0 g. of concentrated sulfuric acid were dissolved, refluxed in a still having a 2-foot fractionating column with a water trap and reflux condenser at its top. Water was withdrawn intermittently during 5 hours of refluxing, after which the esterification was substantially complete. The product was washed with dilute sodium carbonate solution and water until neutral.

The residue was then purified by heating to 150° C. under a pressure of 0.1 mm. to remove water and other volatile impurities. The neutral, odorless, light-colored, oily product thus obtained ($n_D^{29}$ 1.4440, $d_4^{20}$ 1.055), was compatible with and suitable as a plasticizer for polyvinyl chloride, cellulose acetate and ethyl cellulose.

Distillation of this product showed it to consist primarily of bis-(butyl lactate) adipate and butyl (butyl lactate) adipate as well as polylactic esters of adipic acid, present in amounts corresponding to about 0.3, 0.3, and 0.2 mole, respectively, of the adipic acid used in the reaction. The polylactic esters portion of the product consisted mainly of (butyl lactate) (butyl lactyllactate) adipate and bis-(butyl lactyllactate) adipate.

Following the foregoing procedure, two moles of butyl lactate was reacted with one mole of adipic acid. However, in this case varying amounts of butyl adipate were added to the initial reaction mixture. In each instance essentially the same relative yield of the reaction products was obtained as in the control procedure. Formation of butyl adipate in the reaction, however, was suppressed in proportion to the amount of added butyl adipate. Thus, the addition of 0.25, 0.37, and 0.50 mole of butyl adipate to the reaction mixture resulted in the formation of 0.2, 0.1, and 0.07 mole of butyl adipate, respectively, in the course of the esterification process. An initial mixture of reactants consisting of two moles butyl lactate, one mole of adipic acid, and one mole of butyl adipate yielded a reaction product containing only 0.7 mole of butyl adipate.

Following the foregoing control procedure, two moles of butyl lactate was reacted with one mole of adipic acid in the presence of varying amounts of butanol added to the initial reaction mixture. In each case essentially the same total yield of the reaction products was obtained as in the control procedure. Formation of the polylactic esters of adipic acid, however, was repressed by the addition of butanol to the reaction mixture. Thus the addition of 1 mole, and 2 moles of butanol to the reaction mixture resulted in a final product containing the polylactic esters of adipic acid in amounts corresponding to 0.08 and 0.03 mole, respectively, of the adipic acid used in the reaction.

*Example II*

A control was run according to the following procedure:

Five moles of capryl lactate, 2 moles of sebacic acid and 15 g. of p-toluene sulfonic acid were mixed and refluxed as described in Example I, the temperature in the pot not being allowed to exceed 140–150° C. In 3 hours 76 cc. of water was removed and the esterification was substantially complete. The catalyst was neutralized by addition of 35 g. of powdered anhydrous sodium carbonate and stirring for 1½ hours.

The product was then filtered, volatile material was removed by heating to 175° C. at a pressure of 0.1–0.2 mm. and the residue was treated with decolorizing charcoal. The neutral odorless, light-colored, oily product thus obtained ($n_D^{20}$ 1.448, $d_4^{20}$ 0.970) was an excellent plasticizer for polyvinyl chloride and ethyl cellulose.

Distillation of this product showed that it consisted of bis(capryl lactate) sebacate containing some capryl sebacate and mixed esters formed by esterification of sebacic acid with capryl polylactates.

Formation of capryl sebacate, and of the polylactic esters of sebacic acid, was repressed on addition of capryl sebacate and of capryl alcohol, respectively, to the initial reaction mixture, in a manner analogous to that described in Example I, in connection with suppression of butyl adipate, and butyl polylactate adipates formation in the esterification of adipic acid with butyl lactate.

*Example III*

Following the procedure of Example I, two moles of butyl lactate was reacted with 1 mole of sebacic acid. The reaction product so obtained was light colored, oily liquid ($n_D^{20}$ 1.448, $d_4^{20}$ 1.024) highly compatible with polyvinyl chloride and ethyl cellulose. This product was found to consist mainly of bis(butyl lactate) sebacate, containing some butyl sebacate and sebacic acid esters of butyl polylactates.

The formation of butyl sebacate and of the polylactic esters in this esterification process was repressed by addition of butyl sebacate and of butanol, respectively, to the initial reaction mixture, in a manner analogous to that described in Example I in connection with the corresponding esters of adipic acid.

Similar results were obtained essentially by the procedures of the above examples on using corresponding amounts of other dibasic acids such as phthalic, maleic, fumaric, citraconic, itaconic, or succinic in place of adipic or sebacic acid, and other esters of alpha-hydroxycarboxylic acid, like methyl, ethyl, sec.-butyl, octyl, 2-ethylhexyl, 2-chloroethyl, allyl, 2-methallyl, 2-chloroallyl, 2-ethoxyethyl, 2-butoxyethyl, 2-n-hexyloxyethyl, 2-(2-butoxyethoxy) ethyl, or tetrahydrofurfuryl lactate, glycolate or alpha-hydroxy-isobutyrate in place of the lactic esters utilized in the above examples. The characteristics of some of the esters so obtained are shown in the following table wherein lactates ($R'=CH_3$) are the esters of alpha-hydroxycarboxylic acid used in each procedure.

TABLE

| Dicarboxylic Acid | R | $n_D^{20}$ | $d_4^{20}$ |
|---|---|---|---|
| Adipic | Ethyl | 1.4412 | 1.1075 |
| Do | Butyl | 1.4432 | 1.0543 |
| Do | n-Octyl | 1.4482 | 0.9960 |
| Do | 2-Ethylhexyl | 1.4493 | 0.9997 |
| Do | sec.-Butyl | 1.4410 | 1.0574 |
| Do | Allyl | 1.4565 | 1.1085 |
| Do | 2-Butoxyethyl | 1.4472 | 1.0668 |
| Do | 2-n-Hexyloxyethyl | 1.4490 | 1.0327 |
| Do | 2-(2-Butoxyethoxy) ethyl | 1.4507 | 1.0725 |
| Do | Tetrahydrofurfuryl | 1.4680 | 1.1677 |
| Phthalic | do | 1.5030 | 1.2188 |
| Do | 2(2-Butoxyethoxy) ethyl | 1.4790 | 1.1130 |
| Do | 2-Ethoxyethyl | 1.4859 | 1.1622 |
| Do | Allyl | 1.5000 | 1.1725 |
| Do | 2-Chloroallyl | 1.5156 | 1.2964 |
| Maleic | 2-Methallyl | 1.4646 | 1.0935 |
| Do | Methyl | 1.4498 | 1.2076 |
| Do | Ethyl | 1.4478 | 1.1510 |
| Do | Allyl | 1.4600 | 1.1224 |
| Fumaric | do | 1.4650 | 1.1323 |
| Sebacic | 2-Chloroethyl | 1.4651 | 1.1706 |
| Do | Butyl | 1.4465 | 1.0200 |
| Do | Ethyl | 1.4452 | 1.0549 |
| Do | Capryl | 1.4475 | .9740 |
| Do | n-Octyl | 1.4506 | 0.9782 |
| Citraconic | Allyl | 1.4548 | 1.0840 |
| Itaconic | do | 1.4580 | 1.0987 |
| Succinic | Ethyl | 1.4375 | 1.1344 |
| Do | Butyl | 1.4400 | 1.0714 |
| Do | Octyl | 1.4460 | 1.0042 |
| Do | Methyl | 1.4408 | 1.1925 |
| Do | Allyl | 1.4554 | 1.1353 |
| Phthalate of allyl glycolate. | | 1.5162 | 1.2300 |

Other esterification catalysts such as hydrogen chloride or benzenesulfonic acid can be used in lieu of sulfuric acid and toluene sulfonic acid, and toluene or other entraining agents may be used to aid in removal of water during esterification. In the preparation of all these products, the amount of the corresponding alcohol ester of the dicarboxylic acid, and of the esterification products of the dicarboxylic acid with the poly-(hydroxymonocarboxylic acid) esters, formed in the reaction can be repressed by conducting the process in the presence of the corresponding alcohol ester of the dicarboxylic acid and of the corresponding alcohol, respectively, essentially as described in the foregoing examples in connection with the repression of butyl adipate and of the butyl polylactate esters of adipic acid.

We claim:

Plasticizers produced according to the following reaction equation:

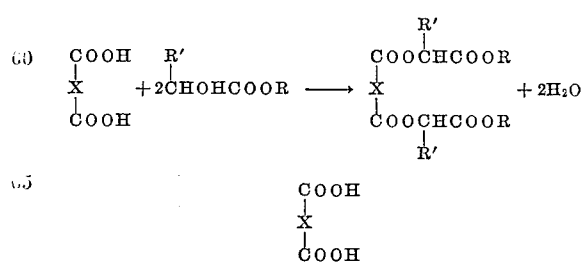

being selected from the group of acids consisting of aliphatic dicarboxylic acids having not more than 10 carbon atoms, and phthalic acid, R being a monovalent organic radical of not more than 8 carbon atoms selected from the group consisting of alkyl, chloroalkyl, alkoxyethyl, alkenyl, chloroalkenyl, and tetrahydrofurfuryl radicals, and R' being selected from the group consisting of H and alkyl, byproduct esters having the formulas

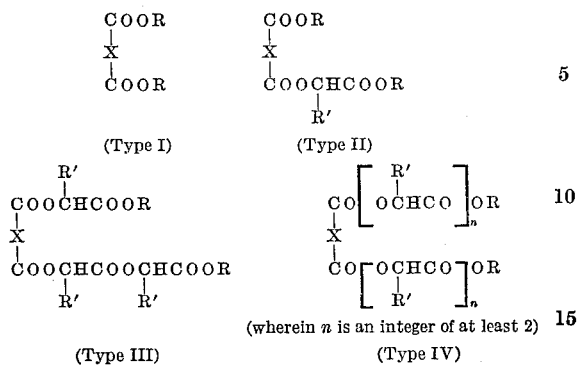

(wherein n is an integer of at least 2)

being also produced, suppressing the amount of the type I byproduct ester produced by addition to the reaction mixture of an ester having the same formula as the type I ester, and suppressing the amount of the type IV byproduct ester produced by addition to the reaction mixture of an alcohol having the formula ROH.

References Cited in the file of this patent

UNITED STATES PATENTS

| | | |
|---|---|---|
| 2,260,295 | Carruthers et al. | Oct. 28, 1941 |
| 2,449,001 | Mikiska | Sept. 7, 1948 |
| 2,452,209 | Rehberg et al. | Oct. 26, 1948 |
| 2,534,255 | Filachione et al. | Dec. 19, 1950 |